UNITED STATES PATENT OFFICE.

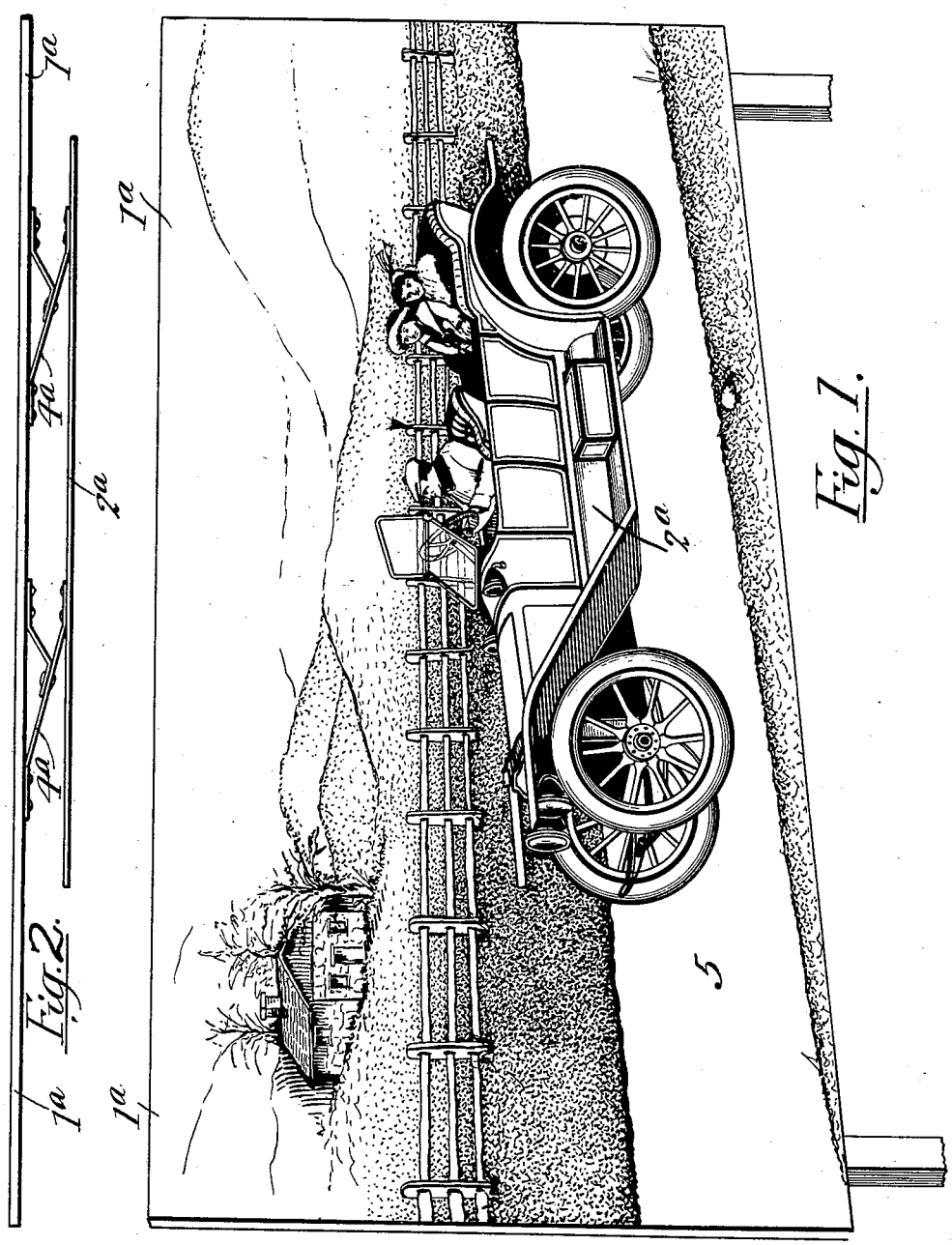

GRIDLEY ADAMS, OF NEW ROCHELLE, NEW YORK.

ADVERTISING-SIGN.

1,096,088. Specification of Letters Patent. Patented May 12, 1914.

Application filed April 2, 1913. Serial No. 758,301.

*To all whom it may concern:*

Be it known that I, GRIDLEY ADAMS, a citizen of the United States, residing in the city of New Rochelle, county of Westchester, and State of New York, have invented a new and useful Improvement in Advertising-Signs, of which the following is a specification.

This invention comprises a sign, and the object is to create the idea of action or intended action in the characters of the sign to persons approaching and passing by. To this end there is a portion projected in front of the main sign board, and this projected portion constitutes a part of the pictorial representation shown on the sign. Preferably, it represents the most important part of the sign, that is to say, the thing to which it is desired particularly to attract attention; and it secures attention both by rendering the salient thing more prominent and by giving a life-like appearance of action or intended action to the whole.

The invention is a concrete embodiment of the "parallax of motion".

The accompanying drawings illustrate one of the numerous possible embodiments of the invention.

In these views: Figure 1 is a front view. Fig. 2 is a top view.

The board 1ª bears the back-ground of a scene; and the portion 2ª represents an automobile passing along a road 5, which is shown on the main board. The projected portion is supported by devices 4ª. The illusion of motion in the automobile is caused to passers by, though all the parts are stationary.

Obviously, the number of different signs that may be made in accordance with the invention is unlimited, but the foregoing will serve as illustrations.

What is claimed as new is:

A sign comprising a continuous board and an isolated element projected to a considerable distance and supported stationarily directly in front of the board, the board and isolated element together bearing a pictorial representation, and said isolated element constituting in outline and in surface decoration the representation of a part in action, whereby to a passer-by an illusion is created of said part executing the action which it is represented as performing.

In witness whereof, I have hereunto set my hand this 29th day of March, 1913.

GRIDLEY ADAMS.

Witnesses:
G. H. EMPEY,
ARTHUR WATSON.

Copies of this patent may be obtained for five cents each, by addressing the "Commissioner of Patents, Washington, D. C."